July 6, 1943.   W. T. WAGNER   2,323,740
V-BELT
Filed March 24, 1941

INVENTOR
WILLIAM T. WAGNER
By Toulmin & Toulmin
ATTORNEYS

Patented July 6, 1943

2,323,740

UNITED STATES PATENT OFFICE 2,323,740

V-BELT

William T. Wagner, Los Angeles, Calif., assignor to The Dayton Rubber Manufacturing Company, Dayton, Ohio, a corporation of Ohio Application March 24, 1941, Serial No. 384,779

7 Claims. (Cl. 74—234)

This invention relates to improvements in power transmission belts.

It is the principal object of this invention to provide a substantially rigid inflexible endless belt whereby power can be directly transmitted through the body of the belt to operate fans, propellers and the like mechanism which requires to be revolved.

Another object is to provide a V-belt for transmitting power which is constructed of metal and rubber composition, wherein the metal comprises a ring forming the core of the belt body with a covering of rubber or resilient material and comprising a rubberized fabric wrapper integrally vulcanized together forming a unitary belt.

Another object is to provide a power transmission endless belt forming a rigid tire-like belt which is reinforced with metal providing a durable substantially noiseless operating belt.

Another object is to provide a power transmission belt which is adapted to be revolved by pulley drive means to transmit power through the body of the belt without the use of additional pulley drive means.

Figure 1:
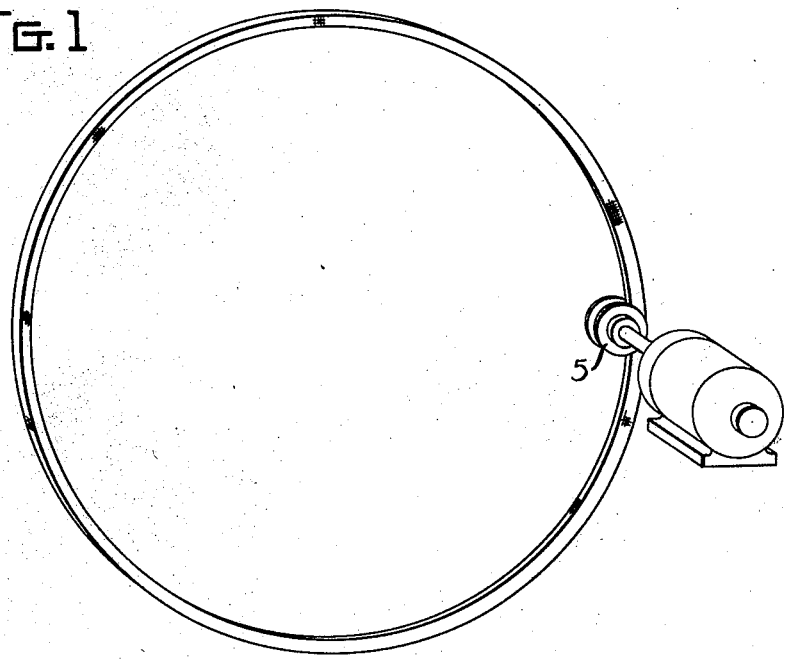
Figure 2:
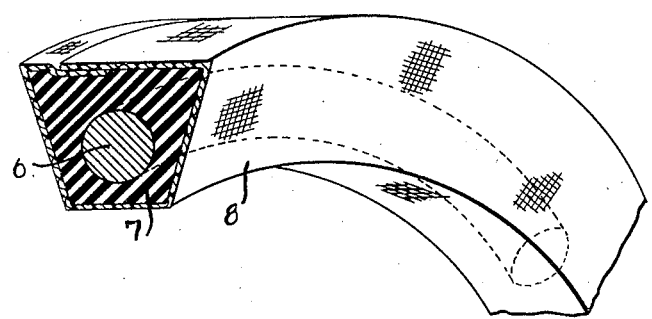

Other objects and advantages of this invention will become apparent from the following description taken in connection with the drawing in which, Figure 1 is a perspective view of one embodiment of a belt made according to this invention and showing an engaging motor driven pulley for rotating the belt;

Figure 2 is a cross section perspective view of the belt illustrated in Figure 1.

Rubber belts have been made heretofore having metal material embedded in the body of the belt but such materials were of a character and design as not to interfere with the flexibility and elastic properties of the rubber so as to provide a highly flexible product. In the belt of this construction, however, it is essential that the belt be constructed so that it is rigid and inflexible while at the same time comprising an outer resilient sound deadening friction drive surface. Such a belt is provided for in my invention by covering a metal ring-like core with a layer of rubber composition, such as commonly used in compounding rubber tires. Other equivalent resilient material such as synthetic rubber, resin and the like, however, may be used in place of rubber. In this way, a substantially undeformable endless drive belt means is provided which can be suitably connected to the mechanism which is to be rotated and driven by contacting the belt with a motor driven pulley 5, as illustrated in Figure 1.

In making the belt, a steel ring 6 is selected or formed which is of the desired size and shape and the ring is covered with rubber composition 7 so as to form a belt body having a steel ring forming the core thereof. Thereafter, the rubber portion 7 is covered with a rubberized fabric layer 8, preferably bias-laid woven fabric, forming a wrapper therearound and the built-up belt is placed in a ring mold having the desired trapezoidal shape and vulcanized to provide a molded integral belt. If desired, a press mold may be utilized instead of the ring mold.

Synthetic rubber, resin, or the like may be used in place of rubber. The rubber can be vulcanized to the metal core or merely molded therearound. Further, the metal core may be of any suitable cross sectional shape, for example, round, square or polygon shaped and a hollow tubular ring member may be used in place of a solid ring. Other arrangements of the metal reinforcing core may be made so long as the belt comprises the desired rigidity whereby power can be transmitted directly therethrough by a pulley drive means.

It will be further understood that this invention is not limited to the specific example illustrated and may be varied to suit different conditions and uses.

Having thus fully described my invention, what I claim as new and desire to secure by Letters Patent is:

1. A power belt comprising a rigid inflexible core with a resilient outer covering, said belt being shaped and molded to provide a V-type belt body.

2. A power belt comprising a rigid metal ring forming the core with an outer covering comprising rubber, said belt being shaped and molded to provide a V-type belt body.

3. An inflexible rigid V-type power belt for operating fans which comprises a rigid steel ring reinforced rubberized belt, wherein said steel ring is embedded in the rubber forming the inner body portion of said belt.

4. An inflexible rigid V-type power belt which comprises a rigid steel ring reinforced rubberized belt, said steel ring being embedded in the rubber body portion thereof, and a rubberized fabric wrapper disposed around and vulcanized to said rubber body portion forming a unitary belt.

5. A V-type substantially nonextensible rigid power belt which comprises an endless rubber body having a rigid metal reinforcing ring means embedded in said rubber body, and a rubberized fabric wrapper disposed around said rubber body and integrally united thereto.

6. A substantially rigid inflexible endless V-shaped power belt comprising a belt body comprising rubber having a reinforcing core consisting of metal, said metal core being rigid, continuous and inextensible, and extending longitudinally of said belt.

7. An improved V-type rigid and inflexible power belt which comprises a layer of rubber composition wound around a rigid metal ring core and a rubberized fabric therearound, the whole being vulcanized and comprising a unitary article.

WILLIAM T. WAGNER.